June 7, 1960
E. WOYDT ET AL
2,939,342
INFINITELY VARIABLE GEAR
Filed Feb. 11, 1959
5 Sheets-Sheet 2
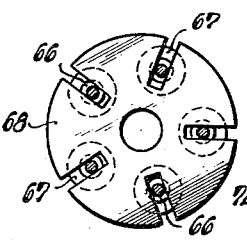
FIG.2
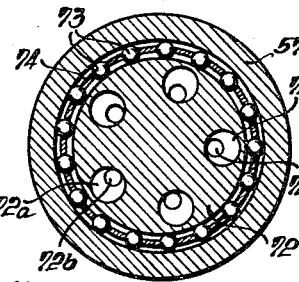
FIG.3
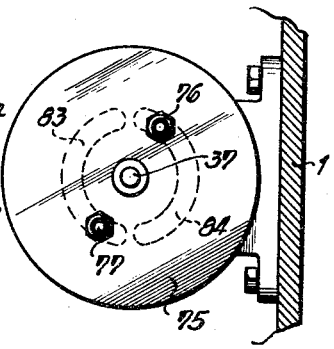
FIG.4
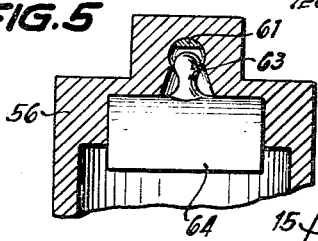
FIG.5
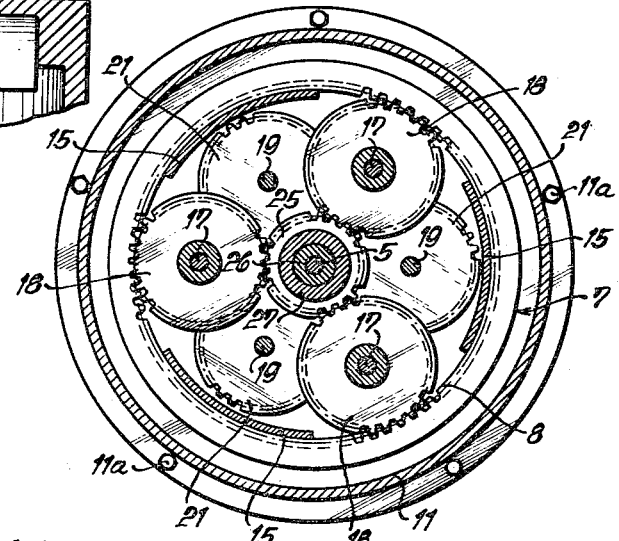
FIG.6
FIG.7
INVENTORS
E. Woydt
A. Hauff
By Glascock Downing Seebold
ATTYS.

INVENTORS
E. Woydt
A. Hauff
ATTYS.

FIG. 12

TABLE OF SPEEDS

| 5 INPUT | 9 OUTPUT | 37 SHAFT | 36 SHAFT | 26 SHAFT | 27 SHAFT | 28 SHAFT | |
|---|---|---|---|---|---|---|---|
| 2000 | 2500 | 0 | -3420 | 0 | 4200 | | |
| 2000 | 2000 | | | 2000 | 2000 | 2000 | |
| 2000 | 1550 | | 0 | | 0 | | SHIFTING |
| 2000 | 1525 | -3200 | | -3900 | | 1270 | |
| 2000 | 690 | 0 | | | | 0 | SHIFTING |
| 2000 | 665 | | +3200 | | -3940 | | |
| 2000 | 0 | +2650 | 0 | | | -1050 | |

United States Patent Office 2,939,342
Patented June 7, 1960

2,939,342
INFINITELY VARIABLE GEAR

Eduard Woydt, Stuttgart, and Alfred Hauff, Kongen, Wurttemberg, Germany; said Hauff assignor to said Woydt Filed Feb. 11, 1959, Ser. No. 792,555

Claims priority, application Germany Mar. 12, 1958

2 Claims. (Cl. 74—687)

The invention is in respect of an infinitely variable gear with a branch-off of the output into infinitely variable—for example, hydrostatic—branches and into invariable branches. The invention is intended more particularly for motor vehicles and railways where the prime mover—for instance a diesel engine—shall run at equal engine speed in all gear positions.

Since the efficiency of the infinitely variable branches of the gear, particularly when they are equipped with hydraulic transmission units such as pumps and hydraulic motors, is inferior to that of invariable branches which are designed as toothed-wheel gears, the invention has set itself the task of keeping as small as possible that part of the output which is transmitted via the infinitely variable units at various speed gear positions. This part is in fact to be small particularly at those speed-gear settings at which the vehicle is mainly operated. In accordance with the invention, the thing that is to be achieved is that such a small portion of the total output shall be transmitted via the infinitely variable—e.g. hydraulic—units, that, even in marginal positions and at part-load where the efficiency of these units becomes very poor, the overall efficiency shall nonetheless still remain at the level desired. In addition, by alternately using the infinitely variable units as driving member or driven member, the hydraulic units especially as pump and as motor, the constructional size is kept small. What is more, the switching-over of the infinitely variable units referred to from a driving function to a driven function or vice versa, particularly from pump to motor, or vice versa, is performed free of shock and without any internal acceleration during the speed-change, by transmitting the drive via planet wheels.

A further aim of the invention is to design the gear in such a way that the infinitely variable units, especially pump and hydraulic motor, are mounted stationary and do not rotate as a complete entity about a shaft in the gearing. One last aim of the invention is to make do on as small a number of infinitely variable units as possible. In fact, with two such infinitely variable units, each having only a small transmission-ratio range, the invention succeeds in covering the gear's entire working range.

The invention consists in the fact that the drive is first of all branched off into at least three sets of planet wheels whose common second member acts direct on the drive shaft, whilst the third member of at least two sets of planet wheels is coupled up each to an infinitely variable unit, these units—which drive each other alternately—being capable, via the sets of planet wheels, of being set in such a way that they work—over the whole gearing's range of adjustment—sometimes as driving unit and sometimes as driven unit. The invention consists especially in the fact that the infinitely variable units are designed as hydrostatic units which function sometimes as a pump and sometimes as a motor.

The invention relates particularly to an infinitely variable gear with output branch-off into mechanical lines and with two hydraulic units working in the fluid-circulation system. With such gears an appreciable advance is achieved along the lines laid down in the foregoing remarks, by means of a switch-over mechanism for the mechanical lines and/or a shift mechanism for the active members (swash plates or eccentrics, for example) of the hydrostatic units such as, when the pitch range of the entire gear is traversed, change over the hydrostatic units once at least from pump to motor or from motor to pump (i.e. one unit from motor to pump and the other unit from pump to motor).

The invention will now be further described with reference to the accompanying drawings in which:

Figure 2 shows a section along line II—II of Figure 1;

Figure 3 shows a section along line III—III of Figure 1;

Figure 4 shows a section along the line IV—IV of Figure 1;

Figure 5 shows a section along line V—V of Figure 1;

Figure 6 shows a section along line VI—VI of Figure 1;

Figure 7 shows the developments of the controller cylinders (42, 43, 54 and 55);

Figure 12 is a speed chart.

Figure 1:
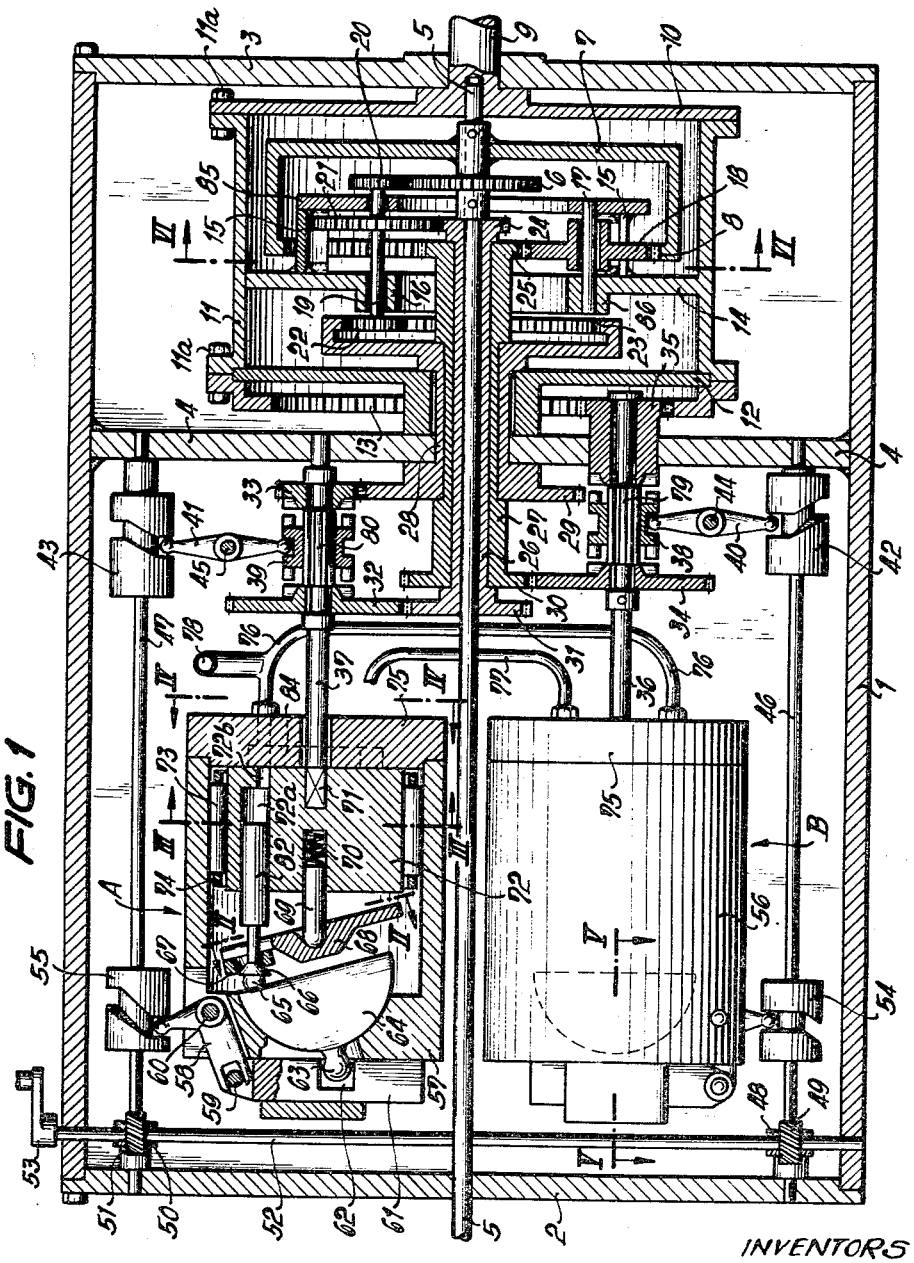
Figure 1 shows a longitudinal section through the gear.

A housing 1 (Figure 1) has a partition wall 4 and lids 2 and 3. In the lid 2 the driving shaft 5 is mounted. On it are firmly seated an input pinion 6 and a drum 7 which carries an internally toothed input gear wheel 8. The driving shaft 5 is mounted with its right end in the driven shaft 9. It is intended inter alia for this gear that, with the drive shaft 5 running at a constant speed the driven shaft 9 shall be steplessly accelerated from stationary to top speed, as is in fact desirable as regards motor vehicles for example.

The shaft 9 is mounted for its part in the lid 3 and it carries a planet gear wheel supporting means in the form of a casing comprising a plate 10 screwed on to a drum 11. The latter carries a wheel 13 with internal teeth and, with the aid of screws 11a, an inner walling 12, and it has a wall 14 on which are located three bosses 18 forming bearings for a set of three identical planet gear wheels 18, and three bosses 16 formed as bearings for two similar sets of planet gear wheels 21 and 22, three segments 15 (see also Figure 6) which are welded on to the wall 14 carrying a second wall 85 which form further bearings for the spindles of the planet wheels.

On each of three planet wheel spindles 17 is seated a planet gear wheel 18 which is in engagement both with the internally toothed input gear wheel 8 as well as with a central pinion 25. On three planet wheel spindles 19 are mounted, on the left-hand side, toothed planet gear wheels 22 which are in engagement with an internally toothed central gear wheel 23. In the middle of each spindle 19 is seated a toothed planet gear wheel 21 which meshes with a central pinion 24, and, on the right-hand side of each spindle 19 is seated a toothed planet gear driving pinion 20 which is in engagement with the input pinion 6.

Pinion 24 is seated on a hollow shaft 26 which carries, on the left, a gear wheel 31 which meshes with a toothed wheel 32. A central pinion 25 is mounted on a hollow shaft 27 which carries, on the left, a toothed wheel 30 which meshes with a toothed wheel 34. Toothed wheel 23 is mounted on the hollow shaft 28 which, on the left, carries a toothed wheel which meshes with a toothed wheel 33. The toothed wheel 13 is in engagement with a toothed casing drive pinion 35. The housing 56 of one hydraulic unit B has a shaft 36; the housing 57 of another hydraulic unit A has a shaft 37. The housings 56 and 57 are secured in the housing 1 and carry lids 75 (Figure 4). On the power transmission shafts 36 and 37 keyways 80 and 79 respectively are fitted, on which sliding gearshift sleeves 38 and 39 are seated. By turning controller cylinders 42 and 43, levers 40 and 41 engaging in curved slots in the controller cylinders are swivelled about their stationary axes 44 and 45, as a result of which the levers move the gearshaft sleeves 38 and 39 in such a way that their jaws come into engagement with jaws of the adjacent gear wheels 32, 33, 34 and 35 respectively thereby coupling these to the shafts 36 and 37 respectively.

At its left-hand end 71 the shaft 37 is firmly connected to the cylinder block 72 of the hydraulic unit A, whilst, on the right-hand side, it is mounted in the partition wall 4.

There is a corresponding arrangement in respect of the shaft 36 of the hydraulic unit B.

The cylinder block 72 is mounted in the housing 57 via a roller bearing 73. The roller bearing 73 has a cage 74 (see Figures 1 and 3).

In the housing 57, on the left, is seated a half-cylinder 64 which, with a spherical-shaped lug 63, projects into a recess 62 of an adjusting bolt 61 (Figures 1 and 5).

By turning a controller cylinder 55 which is seated on a shaft 47 jointly with the controller cylinder 43, a rotatable toggle lever 58 in the housing 57 is swivelled about a bolt 60, as a result of which the adjusting bolt 61 is moved up and down over the pin 59 and swivels the half-cylinder 64 via the ball 63. A spring 70 in the cylinder block 72 presses the latter against the cover 75 of the hydraulic unit, and the pin 69 against the re-set plate 68. The latter, via rings 67, presses on cups 66 on the pistons 82. The cups 66 bear, by way of flattened balls 65, against the half-cylinder 64. With their flat surfaces the balls slide on the half-cylinder 64 and, with their spherical surfaces, they swivel in the rings 67. Figure 2 shows the re-set plate 68 with its slits for five pistons 82 and the rings 67 lying under same, which are able to slide radially on the re-set plate 68.

Figure 3 shows five cylinder bores 72a with their inlet and outlet openings 72b which, while the cylinder block 72 is rotating, stroke alternately over the semicircular recesses 83 and 84—shown in dotted lines in Figure 4—of the housing cover 75 serving as level of control.

The recess 84 is in communication with a ring conduit 76 and the recess 83 communicates with a ring conduit 77. Fitted on the ring conduit 76 is a topping-up pipe 78.

Mounted in the housing 1 is a control shaft 52 which can be actuated via a crank 53 and which, via helical gears 51, 50, rotates the shaft 47 with the controller cylinders 55 and 43 and, via helical gears 49, 48, the shaft 46 with controller cylinders 54 and 42.

When the coupling sleeves 38 and 39 are in the middle position, i.e. in engagement neither on the right nor on the left, as shown in Figure 1, the gear is unable to transmit any power and the drive shaft 5 is able to rotate in utter freedom. To start up the driven shaft 9 as from a stationary position, the coupling sleeves 38 and 39 have to be brought into engagement to the right as is the case in Figure 7 at zero. The curves 55a, 54a, 43a and 42a are the developments of the curved slots in the controller cylinders 55, 54, 43 and 42.

Figure 9:
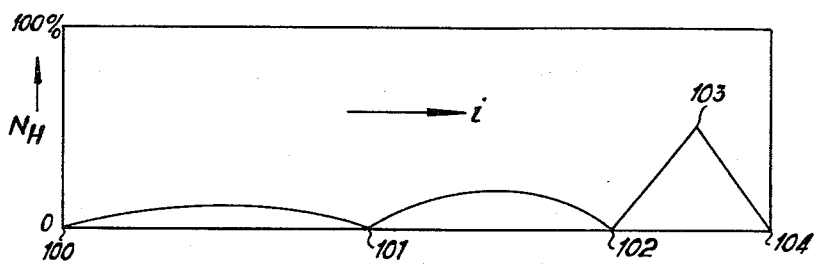
Figure 9 is a curve showing the hydraulic output $N_H$'s share of the total output transmitted by the gear, plotted over the adjustment range $i$.

As far as the figures are concerned, it is as well that the following points should be noted right from the outset: Figure 9 shows that the hydraulic portion of the output is very small for ¾ of the total adjustment range $i$, in fact at three points 100, 101 and 102, it is nil and it only rises to about 40% in a very small and little used working range at point 103.

Apart from very good overall efficiency over a wide working range, small dimensions are achieved in the hydraulic units. At point 104 the reduction is infinite, i.e. the vehicle speed is equal to nil.

Figure 10:
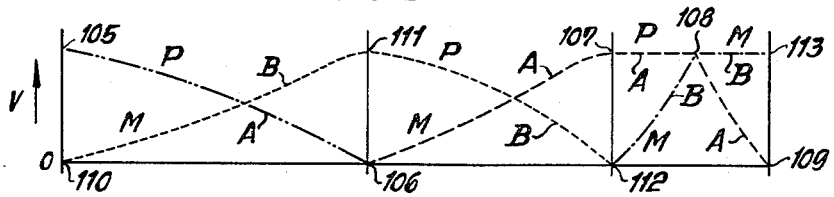
Figure 10 shows the curves of the stroke volumes (V) of the two hydraulic units over the adjustment range $i$, with P denoting the way in which a hydraulic unit works as a pump, and M the way a hydraulic unit works as a motor.

In Figure 10 the stroke volumes of the hydraulic units A and B are plotted upwards of the zero line, whilst in Figure 7 the developments of the curved slots 55a and 54a of the controller cylinders 55 and 54 are plotted. The deviations of the curved slots 54a and 55a from the zero line (Figure 7) correspond to the stroke volumes as per Figure 10. The starting-up operation from 104 to 103 is explained below with reference to the Figures 10, 11, 8 and 7.

For a calculated example in which the drive shaft 5 is powered by a motor with a constant speed of 2000 r.p.m., the speeds of the shafts 36, 37, 26, and 28 are summarised in a speed chart in Figure 12. The speeds of the shafts 36 and 37 are entered in Figure 11 in brackets. The speeds of the driven shaft 9 are plotted in Figure 7 as abscissa values.

Figure 8:
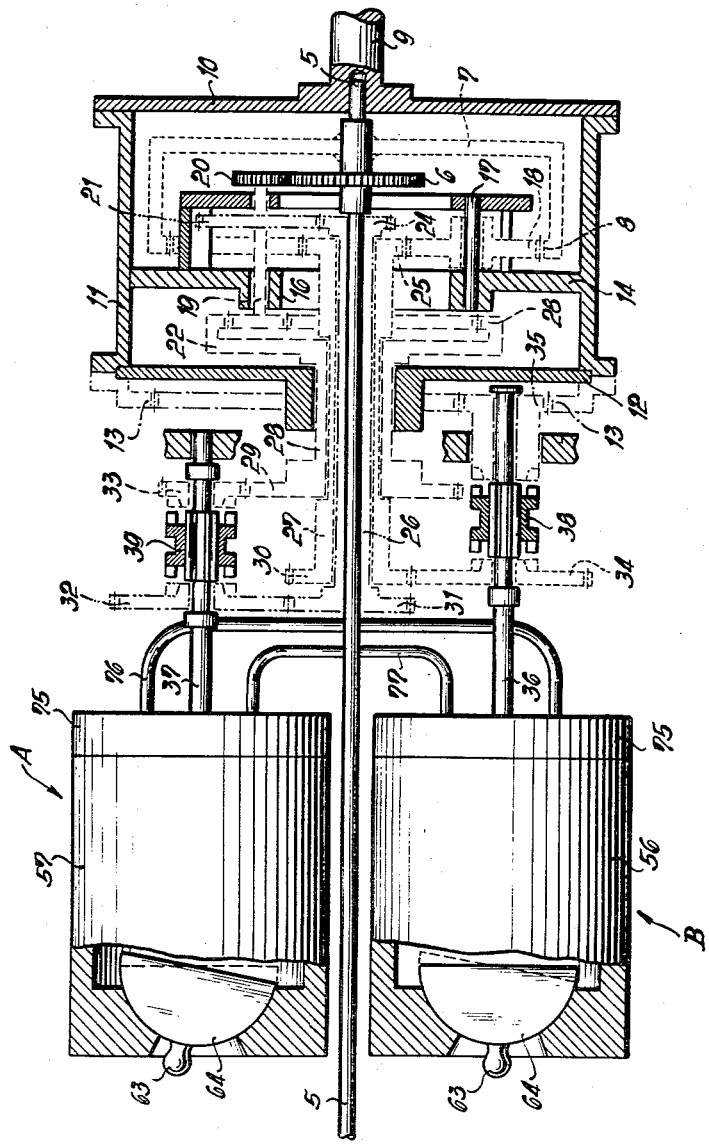
Figure 8 shows a diagram of the gear.

In Figure 8 the half-cylinder 64, with the driven shaft 9 stationary, is in the nil stroke position shown in dotted lines. If the hand crank 53 is turned, the control slots in the controller cylinders 54 and 55 act on the levers (e.g. 58) in a manner such as is shown by the curves 54a and 55a in Figure 7 from point 127 to 126 as well as from point 133 to 132. With the shift—ensuing herefrom—of the half-cylinder 64 in the direction of the arrow, the unit A begins to work as a pump. The stroke is increased in accordance with the curve 109 to 108 of Figure 10. The stroke reaches its maximum at point 108 and stays at maximum until point 107 (dotted curve). At the same time the controller cylinders 42 and 43 are turned, the levers 40 and 41 not being swivelled right away however (cf. Figure 7 curves 42a and 43, right-hand side). As can be seen from Figure 7 curve 43a, the coupling sleeve 39 has to be in engagement with gear wheel 33 right from the start.

In the course of all this, the power flow in the mechanical portion of the gear runs, cf. Figure 8, from the drive shaft 5 via the gear wheels 6 and 20 on to the dotted-line shaft 19 via the gear wheels 22, 23, the hollow shaft 28, via the gear wheels 29 and 33 on to the shaft 37.

By way of the shafts 19 there is already a power output branch-off via the drum 11 on to the drive-off 9.

The other hydraulic unit B works as per the dotted lined curve 113, 108, 112 (Figure 10) as a motor, its half-cylinder being moved from the position plotted in dotted lines in Figure 8 towards the zero position. This takes place (Figure 7) according to the curve 54a from point 133 to 132 by virtue of the fact that the controller cylinder 54 causes a corresponding rotation of the half-cylinder. Because of this, the flow of power, as per Figure 8, passes according to the dot-and-dash line from the shaft 36 via the gear wheels 35 and 13, on to the drive-off 11, 9. This is rendered possible by virtue of the fact that, as can be seen from Figure 7 curve 42a, the coupling sleeve 38 is in engagement, on the right, with gear wheel 35.

Figure 11:
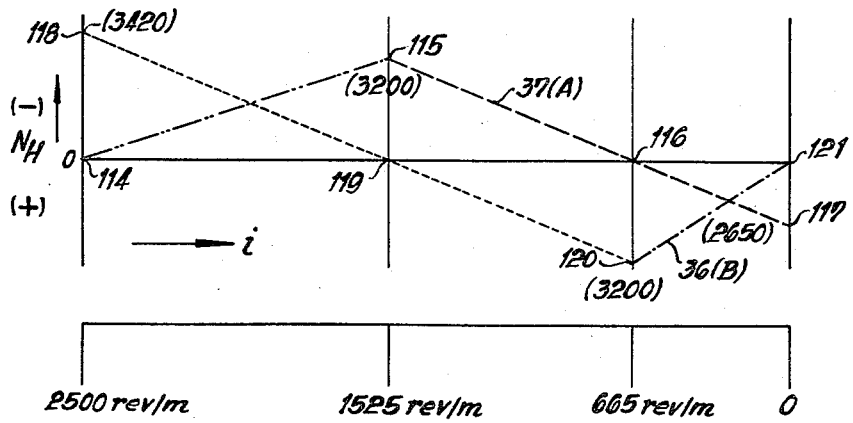
Figure 11 shows the cylindrer-block speed curves $N_H$ over the adjustment range $i$, the one direction of rotation (+) being plotted beneath the zero line and the other direction of rotation (—) above the zero line.

In Figure 11 can be seen the attendant speed progress of the shaft 37 from point 117 to 116, and of the shaft 36 from point 121 to 120. In the course of all this, the hydraulic unit A of the shaft 37 is working as a pump whilst the hydraulic unit B of the shaft 36 is working as a motor.

The vehicle's internal combustion engine should at all times be running at a constant speed ($n=2000$ r.p.m.). At the time of starting up, the speed of the shaft 37 is equal to the section 121 to 117 of Figure 11. Since the half-cylinder 64 is then in the dotted-lined nil stroke position, no power is able to pass through the gear. It is not in fact until the half-cylinder has been brought into deflection in the direction of the arrow that starting-up actually begins (see also the bottom column of the "speed chart," Figure 12).

The starting up operation is terminated at point 103 of Figure 9. Despite this, the speed of travel continues to increase from point 103 to 102 since, in accordance with Figure 10, by further turning the hand crank 53, the stroke volume of the unit B, working as a motor, is reduced from 108 to 112 down to zero, whilst the stroke volume of the unit A, working as a pump, stays constant from 108 to 107, therefore the hydraulic unit B working as a motor, must run faster and consequently, the vehicle must do so too.

At point 112 in Figure 10 the stroke volume of the unit B working as a motor is nil, i.e. the half-cylinder is in the zero position whereas the speed of the shaft 36 of the unit B has reached a maximum at point 120 in Figure 11. The toothed wheel 34 now has exactly the same speed as the shaft 36. (This is the result of the corresponding dimensioning of the set of planet wheels 8, 18, 25.) Since, apart from this, the stroke volume of the unit B is nil at this point, i.e. there is no torque acting on the shaft 36, the coupling sleeve 38 can now easily be brought into engagement with the gear wheel 34.

From Figure 7 can be seen that, while the coupling sleeve 38 is being pushed over, the stroke volumes of the two hydraulic units A and B stay constant, therefore no alteration of speed takes place during the switch-over.

The drive-off speed stays all the time at approximately 665 r.p.m.

The flow of power occurs after the coupling sleeve has been pushed over as per the dotted lines in Figure 8, i.e. from the drive shaft 5 via the gear wheels 8, 18, 25, on to the hollow shaft 27 and via the gear wheels 30, 34, on to the shaft 36. The hydraulic unit B functions as from point 120 of Figure 11 as a pump, for the simple reason that the other hydraulic unit A at point 116 in Figure 11 has changed its direction of rotation, passing through zero in the process. This change of rotary direction is brought about by virtue of the fact that the dimensions of the set of planet wheels 6, 20, 22 and 23 are so selected that at this speed-ratio of drive shaft 5 to the drive-off shaft 9 the speed of the wheel 23 is nil.

According to Figure 10 the unit B functions therefore as a pump from point 112 to 111, and, from point 107 to 106 the unit A functions as a motor. In order to increase the vehicle's speed further, by turning the crank further the stroke volume of the unit B working as a pump is now increased corresponding to curve 112 to 111 of Figure 10, and that of the unit A working as a motor is reduced corresponding to 107 to 106. In Figure 7 this corresponds to the curves 131 to 130 and 125 to 124. At point 119 of the Figure 11 the speed of the unit B working as a pump becomes nil as a result of the corresponding dimensioning of the set of planet wheels 8, 18, 25, and, just as at point 115 of Figure 11, by a corresponding dimensioning of the gear wheels 6, 20, 21, 24, a state of affairs is achieved in which the gear wheel 32 rotates at exactly the same speed as the gear wheel 33 or the shaft 37. The coupling sleeve can therefore easily be brought into engagement with gear wheel 32 more particularly since the stroke volume of the unit A working as a motor is nil here (point 106 Figure 10), therefore no torque is transmitted by the shaft 37.

Because the hydraulic unit B has changed its direction of rotation by way of neutral, as from point 111 to 110 (Figure 10) the unit B again works as a motor and, as from 106 to 105, the unit A again works as a pump.

It can be seen from Figure 7 that, again while the coupling sleeve 39 is being pushed over, the stroke volumes of the two hydraulic units, and, consequently the drive-off speed, stay constant $=\sim1525$ r.p.m.

The flow of power takes place when the crank 53, after the coupling sleeve 39 has been pushed over, is turned further still, corresponding to the dash-and-cross lines in Figure 8, i.e. from the drive shaft 5 via the gear wheels 6, 20, 21, 24, the hollow shaft 26 and the gear wheels 31, 32, on to the shaft 37. By turning the hand crank 53 further still, the stroke volume of the unit A working as a pump is increased corresponding to 106 to 105 of Figure 10, or 123 to 122 of Figure 7 respectively, and the stroke volume of the unit B working as a motor is reduced corresponding to 111 to 110 of Figure 10 or 129 to 128 of Figure 7 respectively, so that ultimately the vehicle's maximum speed is reached at point 110 of Figure 10 or at 2500 r.p.m. in Figure 7.

As is evident from the speed chart (Figure 12) the points 119 and 115, likewise the points 116 and 120 of Figure 11, do not lie exactly one on top of the other but at approximately 25 revolutions of the drive-off shaft away from each other. This difference is necessary in order to ensure a faultless operation of the hydraulic units A and B right through their neutral positions.

In a precisely contrary manner, the speed reduction takes place by turning back the controller cylinders 42, 43, 54 and 55 by means of the hand crank 53.

We claim:

1. An infinitely variable transmission comprising a rotatable driving shaft, a rotatable driven shaft coaxial with the driving shaft, supporting means attached to the driven shaft, a plurality of planetary gear systems each containing a respective set of identical planet gear wheels rotatably mounted in said supporting means, toothed gearing rigid with the input shaft and operatively connected to said planetary gear wheels, two hydraulic units each adapted to operate as a pump and also adapted to operate as a motor, ducts providing intercommunication between the hydraulic units, rotatable controller cylinders mechanically connected to the hydraulic units and adapted to change each of said units over from operation as a pump to operation as a motor and vice versa, and coupling devices adapted to mechanically couple each of said hydraulic units to a respective one of said systems, whereby during the operation of the transmission mechanism power can be transmitted from the driving shaft to the driven shaft partly through the hydraulic units and partly mechanically and independently of the hydraulic units, and the axes of rotation of the planet gear wheels rotate about the common axis of the driving and driven shafts.

2. A transmission mechanism as claimed in claim 1, said supporting means comprising a casing rigid with the driven shaft and enclosing the planet gear wheels, internal teeth on said casing, a casing drive pinion mounted for rotation about a fixed axis and meshing with said internal teeth, a first rotary power transmission shaft projecting from one of the hydraulic units and adapted to be coupled to said casing drive pinion, internal bearings in said casing, planet wheel spindles rotatably mounted in said bearings, planet gear driving pinions each rigid with a respective one of said spindles, said toothed gearing including an input pinion rigid with the driving shaft and meshing with each of the planet gear driving pinions, a first set of said identical planet gear wheels each rigid with a respective one of said spindles, a second rotary power transmission shaft projecting from the other hydraulic unit, a first hollow shaft rotatable coaxially with the driving shaft and having an end which projects from the casing and is adapted to be coupled to the second rotary power transmission shaft, a first central pinion rigid with the first hollow shaft and meshing with each wheel of the first set of planet gear wheels, a second set of said identical planet gear wheels each rigid with a respective one of the planet wheel spindles, a second hollow shaft having an end extending outside the casing and adapted to be coupled to the second rotary power transmission shaft, a central gear wheel rigid with the second hollow shaft and meshing with each wheel of the second set of planet gear wheels, a third set of identical planet gear wheels rotatably supported in the casing, a third hollow shaft rotatable coaxially with the driving shaft and having an end which projects from the casing and is adapted to be coupled to the first power transmission shaft, a second central pinion rigid with the third hollow shaft and meshing with each wheel of the third set of planet gear wheels, said toothed gearing further including an input gear wheel rigid with the driving shaft and meshing with the third set of planet gear wheels.

References Cited in the file of this patent

UNITED STATES PATENTS

| | | |
|---|---|---|
| 2,075,118 | Krell et al. | Mar. 30, 1937 |
| 2,750,812 | Mirone | June 19, 1956 |
| 2,808,737 | Bullard | Oct. 8, 1957 |
| 2,833,160 | Morgan | May 6, 1958 |
| 2,874,591 | Thoma | Feb. 24, 1959 |